United States Patent Office 2,775,622
Patented Dec. 25, 1956

2,755,622

2,2-DIMETHYLOL-1,5-DIHYDROXYPENTANE AND DERIVATIVES THEREOF

John E. Snow, Hasbrouck Heights, N. J., assignor to Heyden Chemical Corporation, New York, N. Y., a corporation of Delaware No Drawing. Application March 27, 1951,
Serial No. 217,885

5 Claims. (Cl. 260—635)

This invention relates to new and novel organic compounds, and more particularly, to 2,2-dimethylol-1,5-dihydroxypentane, derivatives thereof, and to methods for the preparation of these new compositions of matter.

It has now been discovered that 2,2-dimethylol-1,5-dihydroxypentane can be prepared by the condensation of formaldehyde with δ-hydroxy valeraldehyde in the presence of an alkaline condensating agent and that a substantially pure product may be obtained using either crude or refined δ-hydroxy valeraldehyde as the starting material.

In a more specific embodiment of this invention, a δ-hydroxy valeraldehyde solution is slowly added to a mixture consisting of formaldehyde and an alkaline condensing agent, the mixture being maintained at a low temperature, i. e. within the range of 10°–45° C. during this addition. External cooling means are used if necessary to keep the temperature of the mixture from rising beyond the aforesaid range in order to prevent the formaldehyde from entering into other side reactions which would either seriously impair or even prevent the completion of the desired reaction.

The amount of formaldehyde employed is in slight excess of that theoretically required to react with each of the reactive hydrogens of the δ-hydroxy valeraldehyde and actually the molal ratio of formaldehyde to this compound is not less than 1 mol of formaldehyde per mol of active hydrogen in the δ-hydroxy valeraldehyde. An aqueous formaldehyde solution containing about 5–40% by weight of formaldehyde produces good results, best results having been obtained by the use of about a 25% aqueous formaldehyde solution.

The mixture is heated at a moderate temperature varying between about 55°–60° C. until the reaction is substantially completed and then neutralized with formic acid. This is followed by the concentration of the resulting solution under reduced pressure to obtain a solid mixture containing 2,2-dimethylol-1,5-dihydroxypentane and the sodium formate. While good results can be obtained when common mineral acids such as hydrochloric, sulfuric, phosphoric, etc. are employed in this neutralization step, the use of formic acid is preferred to prevent any complications in the process resulting from the introduction of new ions into the solution.

The desired product is then separated from the metal organic salt by treating the concentrate with a lower aliphatic alcohol such as butyl alcohol or ethyl alcohol, the 2,2-dimethylol-1,5-dihydroxypentane readily dissolving in the solvent while the insoluble formate salt is subsequently removed by filtration. The 2,2-dimethylol-1,5-dihydroxypentane is recovered by concentrating this alcoholic solution to a small volume thereby crystallizing the desired product in relatively pure form. Further purification is effected by recrystallizing the product thus obtained from a lower aliphatic alcohol such as methyl alcohol, ethyl alcohol, butyl alcohol, n-propyl alcohol, isopropyl alcohol, etc. While excellent results have been obtained by the use of any of these lower aliphatic alcohols, the use of isopropyl alcohol is preferred because of its low cost and general availability.

It is obvious that valuable derivatives of this tetrahydric compound can be prepared such as the halo-derivatives, esters, acetals, partial esters, ethers, drying oils, alkyd resins, etc. One of these derivatives, i. e. the chloro-substituted compound, has been prepared by reacting 2,2-dimethylol-1,5-dihydroxypentane with thionyl chloride in the presence of pyridine. Other derivatives, such as the esters, are prepared by the conventional methods of esterifying 2, 2-dimethylol-1, 5-dihydroxypentane directly with various acids including rosin and fatty acids (the latter compounds being used in excess quantities) while conducting the reaction at a high temperature. Included in the term fatty acids, are acids such as acetic, formic, propionic, butyric, stearic, lauric, myristic, etc.

2, 2-dimethylol-1, 5-dihydroxypentane is a valuable ingredient of drying oils, various surface coating materials, alkyd resins, etc. The derivatives are likewise extremely useful in the preparation of drying oils, plasticizers, surface active agents, intermediates and the like, their specific properties depending on the particular physical and chemical properties characteristic of these derivatives.

It should be mentioned that the derivatives of 2, 2-dimethylol-1, 5-dihydroxypentane naturally include a wide variety of compounds in addition to those indicated above because of the obvious possibilities offered by the 4 reactive hydroxy groups in the compound, for example, and also in view of such other factors as the extent of the esterification of these hydroxy groups, that is esterification of 1, 2, 3 or all 4 of the hydroxy groups, the nature of the various acids used in the esterification process, etc.

The following examples are illustrative of the particular compounds, compound mixtures and concentrations employed in preparing 2, 2-dimethylol-1, 5-dihydroxypentane and some of its derivatives but are not to be construed as limiting since many variations may be made therein without departing from the spirit or scope of the invention. All parts and percentages are by weight unless otherwise indicated.

EXAMPLE I 91.8 parts (0.9 mol) of δ-hydroxy valeraldehyde is added to a mixture of 156 parts (1.17 mols) of 30% sodium hydroxide solution and 378 parts (3.15 mols) of a cooled (18° C.) 25% formaldehyde solution. This addition of the δ-hydroxy valeraldehyde is continued for a period of 50 minutes during which time a temperature varying between about 18–30° C. is maintained. (The delta compound is prepared by the procedure of Schniepp and Geller as reported in the Journal of the American Chemical Society, vol. 68, pp. 1646–8, 1946, and involves the acid hydrolysis of dihydropyran followed by neutralization and then by distillation under reduced pressure.) The mixture is then heated at a temperature varying between about 55–60° C. for about four hours. Following this refluxing, the mixture is neutralized with formic acid and then concentrated under reduced pressure. Butanol is added to the concentrate thus obtained and the resulting solution is then refluxed for about 12 hours. After removal of the precipitated sodium formate by filtration, the solution is evaporated under reduced pressure to about one half of its volume. The crystalline material that is precipitated out on cooling is recrystallized from isopropanol and then dried. The product obtained had a hydroxyl content of 40.8% and contained 51.16% C and 9.22% H (calculated for 2, 2-dimethylol-1, 5,dihydroxypentane: 41.4% OH, 51.1% C, 9.7% H).

EXAMPLE II

Five hundred parts (5.95 mols) of dihydropyran is boiled with 2000 parts of 0.02 N hydrochloric acid for about 1 hour, and the solution is then neutralized with sodium hydroxide. The mixture which contains approximately 5.95 mols of δ-hydroxy valeraldehyde is then used (without purification) in the following preparation of 2, 2-dimethylol-1, 5-dihydroxy pentane.

To 1953 parts (16.25 mols) of 25% formaldehyde solution and 419 parts of water is added 478 parts (6.03 moles) of 49.6% sodium hydroxide solution over a period of about 15–20 minutes, during which time the temperature is maintained between about 15–25° C. Then the unpurified δ-hydroxyvaleraldehyde solution is added to the mixture over a period of about one hour while a temperature of approximately 20° C. is maintained. After heating this mixture for about five hours at a temperature ranging between about 55–60° C. during which time its formaldehyde content falls to about 0.7%, the solution is neutralized with formic acid and then distilled azeotropically with benzene to remove the water present. Ethanol is added to the residual syrup, and the precipitated sodium formate is filtered off. After the ethanol has been removed by distillation, 300 parts of dioxane is added, and the solution is heated under reflux conditions for about three hours. The crystalline material which is obtained after the solution has been standing for several days is washed with dioxane and then dried at 80–85° C. After recrystallization from isopropanol and drying at 55–60° C., 249 parts of material melting at 90–91° C. is obtained. The product has a hydroxyl content of 39.4% (theory for 2, 2-dimethylol-1, 5-dihydroxypentane is 41.4%).

EXAMPLE III

Twenty-five parts by weight (0.1525 mol) of 2,2-dimethylol-1, 5-dihydroxypentane is mixed with 48.2 parts (0.61 mol) of pyridine. Then 72.5 parts (0.61 mil) of thionyl chloride is added dropwise while the temperature of the mixture is held between about 70 and 80° C. The $SO_2$ present is driven off by heating at about 100–105° C. for about one hour. One hundred parts of water is added, and the solution is cooled to room temperature. One 200 and two 100 part portions of ethylene dichloride are used to extract the product from the reaction mixture. Following removal of the solvent, the residue is distilled at 124–131° C. under 2.5 mm. pressure, to obtain the chloro-substituted product containing 57.2% Cl (theory—60.1%).

By a similar reaction, other substituted halo derivatives may likewise be prepared.

EXAMPLE IV

*Tetraacetate of 2,2-dimethylol-1,5-dihydroxypentane*

Twelve grams (0.073 mol) of 2,2-dimethylol-1, 5-dihydroxypentane and 100 ml. of anhydrous pyridine were placed in a 500-ml. flask and 40 g. (0.39 mol) of acetic anhydride was added. The mixture was allowed to reflux for 1.5 hours. After cooling it was poured into 300 ml. of ice water.

The aqueous suspension was extracted with 150 ml. of ether and the ethereal extract was washed with dilute hydrochloric acid until the washings were acidic. The extract was then washed with 25 ml. of water, 50 ml. of 5% sodium bicarbonate solution and finally with 50 ml. of water. After drying the ether solution over anhydrous sodium sulfate, the ether was removed on a steam bath.

The resulting crude tetraacetate was distilled through a Vigreaux column and was collected at 199–200° C./4 mm. The yield of colorless material was 68%.

*Analysis.*—Calcd. Sap. No. 672 mg. KOH/g.; Found: Sap. No., 672.2 mg. KOH/g.

The preparation of the tetraacetate of 2, 2-dimethylol-1, 5-dihydroxypentane may be represented as follows:

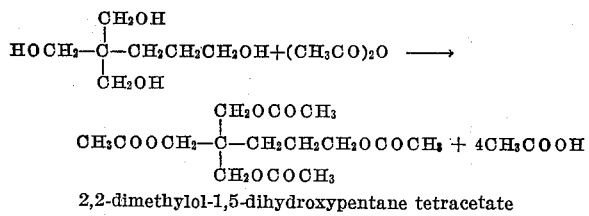

2,2-dimethylol-1,5-dihydroxypentane tetracetate

Whereas this example illustrates a method for the preparation of the tetraacetate of 2, 2-dimethylol-1, 5-dihydroxypentane, it is also quite possible to prepare partial esters, i. e. triacetate, diacetate, monoacetate, and also substitution products of the unesterified hydroxy groups, i. e. halo-derivatives, ethers, etc. of these partial esters. Likewise mixed esters, i. e. different ester groups such as for example a diacetate-diproprionate ester can likewise be prepared.

Reaction of 2, 2-dimethylol-1, 5-dihydroxypentane with other aliphatic saturated acids such as propionic, butyric, stearic, etc. will produce the corresponding esters. The esterification can be carried out by any suitable method which may be selected from the methods well known in the art.

EXAMPLE V

The soy bean fatty acid ester is prepared by heating together with stirring, 30 parts (0.185 mol) of 2, 2-dimethylol-1, 5-dihydroxypentane and 127.8 parts (0.696 mol) of soy bean oil fatty acids (containing $C_{18}$ acids-linoleic and linolenic acids). The reaction is carried out by heating the ingredients together at a temperature of about 230° C. for about five hours. The product, a brown oil, has an acid number of 9.65 mg. KOH/g. The low acid number indicates that substantially complete esterification has been effected.

EXAMPLE VI 15 parts (0.0927 mol) of 2, 2-dimethylol-1, 5-dihydroxypentane and 116.4 parts (0.348 mol) of rosin (containing abietic acid as the principal component) is heated together with stirring at a temperature varying between about 270–300° C. for approximately 8 hours to form the rosin ester. The ester possesses a saponification number of 51.9 mg. KOH/g. and an acid number of 26.3 mg. KOH/g. Its hydroxyl content is 0.5%.

EXAMPLE VII

The linseed oil fatty acid ester (containing esters of linoleic and linolenic acids) is prepared by reacting thirty parts (0.185 mol) of 2, 2-dimethylol-1, 5-dihydroxypentane at approximately 230° C. for about 4½ hours with 193 parts (0.696 mol) of linseed oil fatty acids to form a drying oil with an acid number of 5.47 mg. KOH/g.

EXAMPLE VIII

An alkyd resin is prepared by heating 119.3 parts by weight of soybean oil fatty acids, 50.3 parts of phthalic anhydride, and 50.1 parts of 2,2-dimethylol-1, 5-dihydroxypentane together at a temperature of about 230° C. for about 15 hours. At the end of this time the resin has an acid number of 8 mg. KOH/g. A 70% solids solution of the resin in mineral spirits is prepared to which 0.08% cobalt and 0.02% manganese as the naphthenates are added. When maple panels to which two coats of the alkyd solution had been applied were exposed to weathering in Florida and New Jersey, it was found that this alkyd showed resistance to weathering comparable to that exhibited by the equivalent pentaerythritol or glycerine alkyd.

EXAMPLE IX

*2,2-dimethylol-1,5-dihydroxypentane monoformal*

Twenty grams of 2,2-dimethylol-1,5-dihydroxypentane, 4.0 grams of paraformaldehyde, 50 ml. of benzene, and 1.0 ml. of concentrated hydrochloric acid were azeotroped for 4 hours until 3.0 ml. of water was obtained (theory, 3.95 ml.). The benzene was removed under water pump vacuum (30 mm.) at 50° C. The monoformal was vacuum distilled at 193° C./4.0 mm. The product, amounting to 11.7 g. was a white solid, M. P. 52–58° C. On analysis it was found to contain 18.65% hydroxyl, 21.0% formaldehyde, 0.7% water (theory 20.7% hydroxyl, 17.1% formaldehyde).

The above described reaction may be represented as follows:

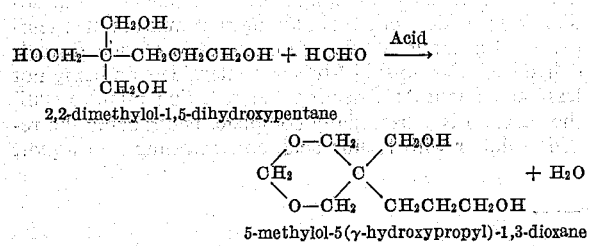

5-methylol-5(γ-hydroxypropyl)-1,3-dioxane

EXAMPLE X

*2,2-dimethylol-1,5-dihydroxypentane monobutyral*

Twenty grams of 2,2-dimethylol-1, 5-dihydroxypentane, 10.0 g. n-butyraldehyde, 50 ml. benzene, and 1.0 ml. concentrated hydrochloric acid were azeotroped for 4 hours until 4.0 ml. of water was obtained (theory 3.7 ml.). The benzene was removed under water pump vacuum (30 mm.) at 50° C. The monobutyral was vacuum distilled at 220° C./3.5 mm. The product, about 10 g., was a colorless, waxy solid which was found on analysis to be 13.9% hydroxyl, 1.0% water (theory, 15.5% hydroxyl).

By reacting similarly other aliphatic saturated aldehydes such as acetaldehyde, propionaldehyde, etc. with 2,2-dimethylol-1,5-dihydroxypentane, corresponding acetals can be obtained.

The above described reaction may be represented as follows:

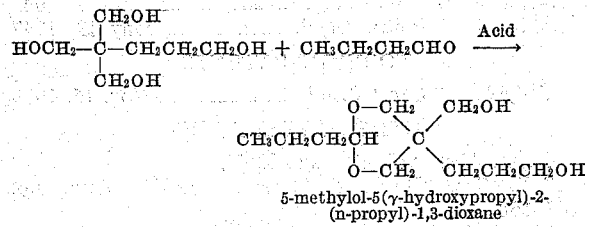

5-methylol-5(γ-hydroxypropyl)-2-(n-propyl)-1,3-dioxane

EXAMPLE XI

The following example illustrates a method for the preparation of a polymeric acetal. By similar methods, other polymeric acetals can likewise be prepared.

*2,2-dimethylol-1,5-dihydroxypentane polymeric formal*

In a 300-ml. three-necked flask was placed 32 g. (0.2 mol) of 2, 2-dimethylol-1, 5-dihydroxypentane, 37 g. (0.4 mol) of 37% aqueous formaldehyde and 1 g. of concentrated hydrochloric acid. The flask was equipped with a stirring device, condenser, and thermometer. The mixture was refluxed for 12 hours.

At this point the excess formaldehyde and water were removed by heating to 90–95° C. under reduced pressure. The residue was a viscous, sticky mass. The yield was approximately 75%.

*Analysis.* — Calcd. for diformal; percent OH, 0; combined formaldehyde, 31%. Found: percent OH, 3.30; combined formaldehyde, 25.7%; acidity, 13.0 mg. KOH/g.

The above described reaction may be represented as follows:

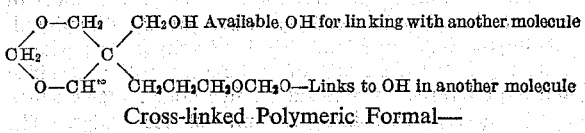

Cross-linked Polymeric Formal—

Due to the unsymmetrical structure and size only the one intra-molecular ring will form easily.

EXAMPLE XII

The β-hydroxyethoxy ethyl ether of 2,2-dimethylol-1,5-dihydroxypentane was prepared as an intermediate for further derivatives. Fifty grams of the 2,2-dimethylol-1,5-dihydroxypentane, 288 g. of dry xylene, and 0.5 g. of freshly cut sodium were reacted in a 1-liter bomb for 3 hours at 155–175° C. with 119 g. of ethylene oxide. The xylene was then removed under water pump vacuum (60 mm.) at 95° C. The product was treated with 3.0 g. of Darco G-60 charcoal and filtered hot. The product, a viscous amber colored liquid, amounted to 80.3 g. and contained 12.06% hydroxyl (theory 13.2%).

By reacting 2,2-dimethylol-1, 5-dihydroxypentane with other lower aliphatic saturated alkylene oxides i. e. propylene, butylene, etc. corresponding alkyl ethers are prepared. The ether groups of the compounds produced can be esterified with aliphatic saturated acids, as indicated in the following examples.

The above described reaction can be represented as follows:

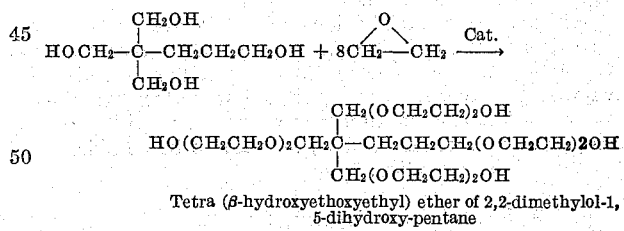

Tetra (β-hydroxyethoxyethyl) ether of 2,2-dimethylol-1, 5-dihydroxy-pentane

EXAMPLE XIII

In a 500-ml. three-necked flask were placed 12 g. (0.023 mol) of the tetra (β-hydroxyethoxy ethyl) ether of 2,2-dimethylol-1,5-dihydroxypentane, 6.6 g. (0.023 mol) of stearic acid (Hystrene S–97), 75 ml. of concentrated sulphuric acid and 75 ml. of anhydrous toluene. The flask was equipped with stirring, a source of nitrogen, a condenser and a water collector. The mixture was refluxed under nitrogen for 8 hours during which time the theoretical amount of water was collected.

The reaction mixture was decanted from unreacted alcohol and dried over anhydrous sodium sulfate. The solution was then heated to 75° C. with 1 g. of Darco G–60 charcoal for ten minutes. Upon filtration of the Darco and removal of the solvent the waxy stearate ester remained.

*Analysis.*—Calcd. (for monostearate): Sap. No., 71.8 mg. KOH/g.; percent OH, 6.5. Calcd. (for distearate): Sap. No., 107 mg. KOH/g.; percent OH, 3.2. Found: Sap. No., 95 mg. KOH/g.; percent OH, 2.78; acidity, 10.0 mg. KOH/g.

The above described reaction can be represented as follows:

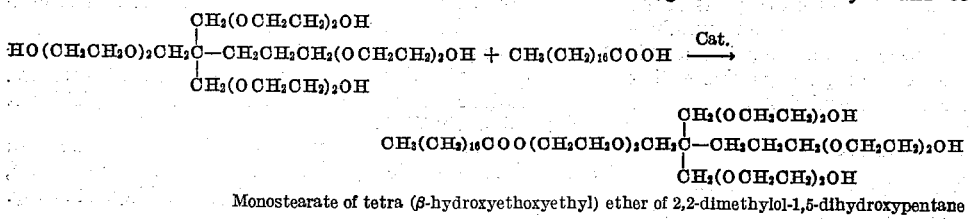

Monostearate of tetra (β-hydroxyethoxyethyl) ether of 2,2-dimethylol-1,5-dihydroxypentane

EXAMPLE XIV

In a 250-ml. flask were placed 15.5 g. (.03 mol) of tetra (β-hydroxyethoxyethyl) ether of 2,2-dimethylol-1,5-dihydroxypentane and 40 ml. of anhydrous pyridine. Sixteen grams (0.15 mol) of acetic anhydride was added and the mixture was refluxed for five hours. It was then cooled and poured into 200 ml. of ice water. The aqueous suspension of the ester was extracted with ether and the ethereal extract was washed with dilute hydrochloric acid until the washings were acid. It was then washed with water (50 ml.), 5% sodium bicarbonate solution (50 ml.) and 50 ml. of water.

The solution was dried over anhydrous sodium sulfate and the solvent removed under reduced pressure. The residue was a light tan liquid.

*Analysis.*—Calcd.: Sap. No., 328 mg. KOH/g. Found: Sap. No., 346 mg. KOH/g.

The above described reaction can be represented as follows:

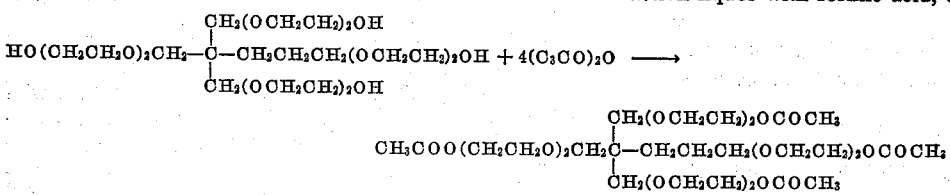

Tetraacetate of tetra (β-hydroxyethoxyethyl) ether of 2,2-dimethylol-1, 5-dihydroxypentane By reacting the above identified ether with alkyl halides, alkyl sulfates, etc., other derivatives of the ether can likewise be prepared.

While various modifications of the above invention have been described, it is to be understood that other variations may be made in carrying out this invention, without departing from the spirit and scope thereof. Insofar as these modifications or changes are within the scope of the appended claims, they are to be considered as part of this invention.

I claim:

1. 2,2-dimethylol-1,5-dihydroxypentane.

2. A process for the preparation of 2,2-dimethylol-1,5-dihydroxypentane which comprises reacting an aqueous solution of formaldehyde and δ-hydroxyvaleraldehyde in the presence of an alkaline condensing agent and then recovering the desired product from the reaction mixture.

3. A process for the preparation of 2,2-dimethylol-1,5-dihydroxypentane which comprises reacting an aqueous solution of formaldehyde containing about 5–40% by weight of formaldehyde and δ-hydroxyvaleraldehyde in the presence of an alkaline condensing agent, the molal ratio of said formaldehyde solution to said δ-hydroxyvaleraldehyde being not less than about 1:1, and then recovering the desired product from the reaction mixture.

4. A process for the preparation of 2,2-dimethylol-1,5-dihydroxypentane which comprises adding a solution of δ-hydroxyvaleraldehyde to a mixture comprising an aqueous formaldehyde solution containing about 25% by weight of formaldehyde and sodium hydroxide while maintaining said mixture at a temperature ranging between about 10°–45° C., heating the resulting mixture until the reaction is substantially complete, followed by neutralization thereof, concentrating the resulting solution, treating the concentrate thus obtained with a lower saturated aliphatic alcohol thereby separating the desired material from the solution, concentrating the resulting alcoholic solution to obtain 2,2-dimethylol-1,5-dihydroxypentane in a crystalline and substantially pure form.

5. A process for preparing 2,2-dimethylol-1,5-dihydroxypentane in substantially pure form which comprises adding a δ-hydroxyvaleraldehyde solution to a mixture comprising an aqueous formaldehyde solution containing about 25% by weight of formaldehyde and sodium hydroxide while maintaining said mixture at a temperature of about 20° C., the molal ratio of said formaldehyde solution to said δ-hydroxyvaleraldehyde being not less than about 1:1, heating the resulting mixture until the reaction is substantially complete, neutralizing the reaction liquor with formic acid, concentrating said liquor, separating said 2,2-dimethylol-1,5-dihydroxypentane from the metal formate salt by treatment with n-propyl alcohol, concentrating the resulting alcoholic solution thereby crystallizing the desired product, and then obtaining said 2,2-dimethylol-1,5-dihydroxypentane in substantially pure form by recrystallization from an n-propyl alcohol solution.

References Cited in the file of this patent

UNITED STATES PATENTS

| | | |
|---|---|---|
| 2,172,305 | Wolff et al. | Sept. 5, 1939 |
| 2,270,839 | Wyler | Jan. 20, 1942 |
| 2,360,186 | Wyler | Oct. 10, 1944 |
| 2,387,019 | Hass et al. | Oct. 16, 1945 |
| 2,400,724 | Walker | May 21, 1946 |
| 2,413,803 | Tribit | Jan. 7, 1947 |
| 2,420,496 | Poitras et al. | May 13, 1947 |

FOREIGN PATENTS

| | | |
|---|---|---|
| 514,693 | Great Britain | Nov. 15, 1939 |

OTHER REFERENCES

Chem. Abst., vol. 42, page 2267i.

Bull. Soc. Chem. de France (1947), Paul, pp. 165–168.

Chemical Abstracts, vol. 44 (1950), page 113C; (Abstract of Annalen 562 (1949), pp. 75–136, article by Siefken).